3,013,950
CULTURE APPARATUS
John J. Gavin, Levittown, Pa., assignor to Fund For Research Therapeutics, Norristown, Pa., a non-profit trust
Filed Sept. 9, 1959, Ser. No. 838,975
5 Claims. (Cl. 195—142)

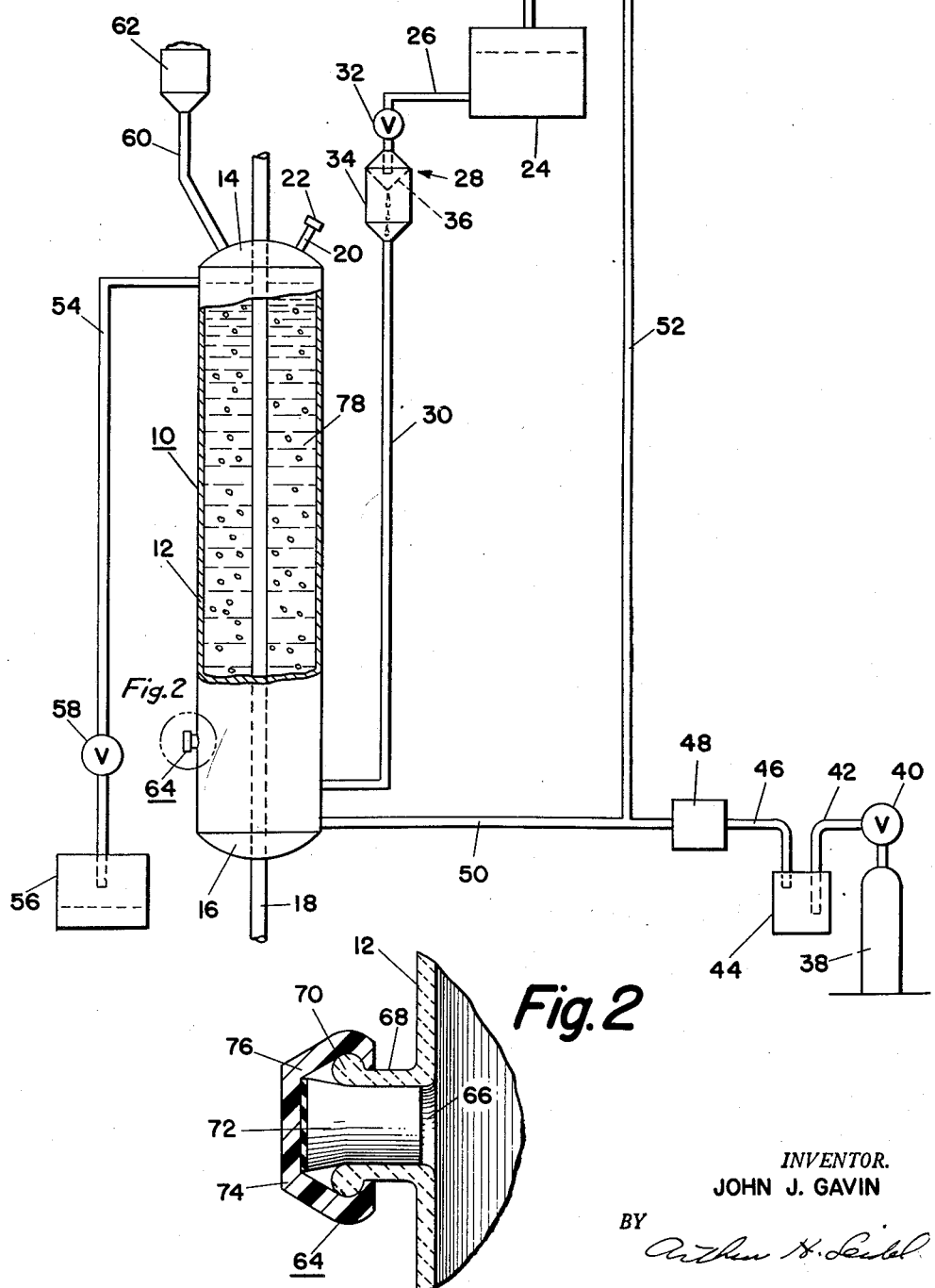

The present invention relates to a culture apparatus, and more particularly to an apparatus for the continuous growth of microbial and mammalian cells.

It is an object of the present invention to provide a novel culture apparatus different from those heretofore described.

It is another object of the present invention to provide an apparatus for the continuous growth of microbial and mammalian cells.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a diagrammatic view of the culture apparatus of the present invention.

FIGURE 2 is a sectional view, partially in elevation, of the sample port of the culture vessel of the present invention which is encircled in FIGURE 1.

Referring initially to FIGURE 1, the culture apparatus of the present invention comprises a culture vessel, generally designated as 10. Culture vessel 10 comprises an upright cylindrical wall 12 having a closed top 14 and a closed bottom 16. A pipe 18 extends longitudinally through the wall 12, and projects through openings in the top 14 and bottom 16. The openings in the top 14 and bottom 16 through which the pipe 18 passes are sealed tight around the pipe 18 so that the culture vessel 10 is completely enclosed. Pipe 18 is connected to a source of a temperature control medium, not shown. A port 20 is provided through the top 14 of the culture vessel 10, and a cap 22 seals the port 20 closed. Port 20 permits the cells to be cultured in the vessel 10 to be admitted into the vessel 10.

A reservoir 24 containing a culture medium is provided at a higher level than the culture vessel 10. A pipe 26 connects the bottom of the reservoir 24 to a flow control device, generally designated as 28. A pipe 30 connects the flow control device 28 to the culture vessel 10. Pipe 30 enters the culture vessel 10 through the wall 12 adjacent to the bottom 16.

Flow control device 28 comprises a valve 32 connected to the pipe 26 from the reservoir 24. The outlet port of the valve 32 is connected to the inlet end of a tubular container 34. A conical diaphragm 36 is secured across the interior of the container 34. The apex of the diaphragm 36 has a small hole therethrough which breaks up a continuous flow of a liquid into the container 34 into a drop-by-drop flow from the container 34. The pipe 30 to the culture vessel 10 is connected to the outlet end of the container 34.

A tank 38 containing a gas under pressure is connected through valve 40 and pipe 42 to a completely enclosed container 44 which is partly filled with water. The pipe 42 extends into the container 44 to a point below the level of the water within the container 44. A pipe 46 connects the container 44 to a filter 48. The pipe 46 extends into the container 44 to a point above the level of the water within the container 44. The filter 48 is connected to the culture vessel 10 through a pipe 50. Pipe 50 extends into the culture vessel 10 through the wall 12 at a point adjacent the bottom 16. A pipe 52 connects the pipe 50 to the top of the reservoir 24 above the level of the culture medium within the reservoir 24.

An outlet pipe 54 extends from the wall 12 of the culture vessel 10 adjacent the top 14. Outlet pipe 54 extends to a collection receptacle 56. Outlet pipe 54 is provided with a valve 58 to control the flow through the outlet pipe 54. A vent pipe 60 extends upwardly from the top 14 of the culture vessel 10, and a filter 62 is provided at the top end of the vent pipe 60.

Culture vessel 10 has a sample port 64 in the wall 12 adjacent the bottom 16. Sample port 64 comprises an opening 66 in the wall 12 of the culture vessel 10 and a cylindrical flange 68 extending from the wall 12 around the opening 66. The flange 68 is provided with a beaded lip 70 at its outer end. A rubber plug 72 is seated tightly within the flange 68 to close the opening 66. Plug 72 is provided with a thin layer 74 of a self-sealing rubber on the outer end thereof. A cap 76 of a plastic material or the like fits across the outer end of the plug 72, and is secured to the beaded lip 70 of the flange 68. Cap 76 keeps the self-sealing layer 74 of the plug 72 clean.

The culture apparatus of the present invention operates at follows:

The culture vessel 10 which is filled with a culture medium 78 is inoculated with the cells to be grown through the port 20 in the top 14 of the vessel 10. A fluid or gas which is at a constant temperature is circulated through the pipe 18 to maintain the desired constant incubation conditions within the culture vessel 10.

Valve 40 is opened to permit the flow of gas from the gas tank 38. The gas in the tank 38 is either oxygen, air, or an air-carbon dioxide mixture for the purpose of aerating the culture medium 78 within the vessel 10. The gas from the tank 38 flows through the water in the container 44 to saturate the gas with water vapor. The water saturated gas passes through the pipe 46 and filter 48, which is a bacteriological filter to remove any undesired contaminants from the gas. The gas from the filter 48 flows through the pipe 50 into the culture vessel 10. In the culture vessel 10, the gas bubbles up through the culture medium 78 to aerate and agitate the culture medium 78. The gas that reaches the top 14 of the culture vessel 10 escapes from the culture vessel 10 through the vent pipe 60 and the filter 62.

Some of the gas passing through the pipe 50 from the filter 48 passes up through the pipe 52 into the top of the reservoir 24. The gas entering the top of the reservoir 24 applies a pressure to the culture medium in the reservoir 24 to provide a constant flow of the culture medium from the reservoir 24 to the culture vessel 10.

The culture medium flows from the reservoir 24 to the culture vessel 10 through the pipe 26, the flow control device 28, and the pipe 30. The flow control device 28 controls the rate of flow from the reservoir 24 to the culture vessel 10. The valve 32 controls the rate of the flow, and the diaphragm 36 in the container 34 breaks up the stream of liquid into a drop-by-drop flow. The drop-by-drop flow from the container 34 provides for ease of determining and controlling the rate of flow of the culture medium to the culture vessel 10. The container 34 is preferably made of a transparent material so that the drops of the culture medium passing through the diaphragm 36 can be counted for the purpose of controlling the flow. For the culture of most types of cells, the flow of the culture medium from the reservoir 24 to the culture vessel 10 is very slow, approximately eight (8) drops per minute.

The cells being grown in the culture vessel 10 adhere to the inner surface of the bottom 16. As the cells grow, some of the cells break away from the bottom 16 of the vessel 10 and are carried upwardly through the culture medium 78 to the top level of the culture medium 78. When the level of the culture medium 78 rises, due to the addition of the culture medium from the reservoir 24, to the level of the outlet pipe 54, the culture medium with the cells therein will flow through the outlet pipe 54 into the collection receptacle 56. Thus, a harvest of the cells is obtained without disturbing the continuation of the growth of the cells within the culture vessel 10. As the cells within the culture vessel continue to grow, more and more of the cells will break away from the bottom 16 of the vessel 10 so that a continuous harvest of the cells is obtained.

During the growth of the cells within the culture vessel 10, it may be desired to test the conditions of the culture medium 78 adjacent the cells at the bottom 16 of the vessel 10. For the purpose, the cap 76 is removed from the sample port 64 to expose the plug 72. A hypodermic needle is then inserted through the plug 72 into the culture vessel 10 to obtain a sample of the culture medium 78. When the hypodermic needle is removed from the plug 72, the self-sealing layer 74 will seal the hole in the plug 72 made by the hypodermic needle. The cap 76 is then placed back over the plug 72 to maintain the plug 72 clean.

Although the culture apparatus of the present invention has been described with regard to the growing of cells which during their growth adhere to the bottom 16 of the vessel 10, the culture apparatus of the present invention can also be used for growing bacteria. In the growing of bacteria, the bacteria are dispersed throughout the culture medium 78 within the culture vessel 10. Thus, when the culture medium 78 within the culture vessel 10 rises to the outlet pipe 54, the overflow of the culture medium 78 through the outlet pipe 54 will carry some of the bacteria to the collection receptacle 56. However, since the flow of the culture medium 78 through the culture vessel 10 is very slow, the culture medium 78 will always contain some bacteria due to the growth of the bacteria.

The present invention may be embodied in other specific forms without departing from the spirit or essential attributes thereof and, accordingly, reference should be made to the appended claims, rather than to the foregoing specification as indicating the scope of the invention.

I claim:

1. Culture apparatus comprising an enclosed culture vessel, means for maintaining a constant temperature in said vessel, a reservoir for a culture medium, a pipe connecting said reservoir to said vessel adjacent the bottom of said vessel to feed the culture medium from the reservoir to the vessel, means in said pipe to control the flow of culture medium to said vessel, a source of gas under pressure, said source of gas being connected to said vessel adjacent the bottom of said vessel, means for continuously harvesting cells grown within said vessel including an overflow pipe extending from said vessel adjacent the top of said vessel, said reservoir being enclosed, the source of gas being connected to the top of said reservoir above the level of the culture medium in said reservoir to provide a constant flow of the culture medium from the reservoir, said pipe connecting said reservoir and said vessel being the sole outlet from said reservoir, the means for controlling the flow of the culture medium from the reservoir to the culture vessel comprises a valve, said reservoir being positioned in a plane above the top of said vessel, and means connected between the valve and the culture vessel for providing a drop-by-drop flow of the culture medium to the culture vessel.

2. A culture apparatus in accordance with claim 1 including means between the source of gas and the culture vessel for saturating the gas with water vapor, and a filter between said means for saturating the gas with water vapor and the culture vessel.

3. Culture apparatus in accordance with claim 2 in which the culture vessel has a vent pipe extending from the top of the vessel, a filter at the top of said vent, and an inlet port extending to the top of said vessel.

4. Culture apparatus in accordance with claim 3 in which the culture vessel comprises an upright cylindrical wall having a top and a bottom and the means for maintaining a constant temperature in said vessel comprises a pipe extending longitudinally through said vessel, said pipe being adapted to receive a temperature control medium.

5. Culture apparatus in accordance with claim 1 wherein said means for providing drop-by-drop flow of the culture medium is a transparent container having a conical diaphragm therein, and a small hole in the apex of said diaphragm.

References Cited in the file of this patent

UNITED STATES PATENTS

| | | |
|---|---|---|
| 1,227,525 | Boidin et al. | May 22, 1917 |
| 1,680,043 | Heijkenskjold | Aug. 7, 1928 |
| 2,422,777 | Eisenberg | June 24, 1947 |
| 2,519,902 | Haller | Aug. 22, 1950 |
| 2,686,754 | Monod | Aug. 17, 1954 |
| 2,689,818 | Fischer | Sept. 21, 1954 |